(12) United States Patent
Robertson, Jr. et al.

(10) Patent No.: US 11,520,012 B2
(45) Date of Patent: Dec. 6, 2022

(54) SENSOR DRAINAGE SYSTEM

(71) Applicant: Ford Global Technologies, LLC, Dearborn, MI (US)

(72) Inventors: Michael Robertson, Jr., Livonia, MI (US); Venkatesh Krishnan, Canton, MI (US); Segundo Baldovino, Novi, MI (US); Sunil Reddy Patil, Troy, MI (US); Rashaun Phinisee, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 803 days.

(21) Appl. No.: 16/521,714

(22) Filed: Jul. 25, 2019

(65) Prior Publication Data

US 2021/0025982 A1 Jan. 28, 2021

(51) Int. Cl.
*G01S 7/48* (2006.01)
*G01S 7/481* (2006.01)
*G01S 7/497* (2006.01)

(52) U.S. Cl.
CPC ............ *G01S 7/4813* (2013.01); *G01S 7/497* (2013.01); *G01S 2007/4977* (2013.01)

(58) Field of Classification Search
CPC ................... G01S 7/4813; G01S 7/497; G01S 2007/4977; G01S 17/931; B60S 1/54; B60S 1/56; G01D 11/26; G01D 11/00; G01D 11/245; B60R 11/00; B60R 2011/004; B60R 2011/0094

See application file for complete search history.

(56) References Cited

U.S. PATENT DOCUMENTS

| 2011/0073142 A1 | 3/2011 | Hattori et al. |
| 2018/0134258 A1* | 5/2018 | Ekola ........................ B60S 1/52 |
| 2019/0016306 A1 | 1/2019 | Krishnan et al. |

FOREIGN PATENT DOCUMENTS

| CN | 106945612 A | 7/2017 |
| CN | 208255419 U | 12/2018 |

* cited by examiner

*Primary Examiner* — Girumsew Wendmagegn
(74) *Attorney, Agent, or Firm* — Frank A. MacKenzie; Bejin Bieneman PLC

(57) ABSTRACT

A sensor assembly includes a cylindrical sensor housing extending vertically upward from a sensor-housing bottom, a gutter elongated circumferentially around the sensor-housing bottom, a drain channel extending radially outward from the gutter, at least one air nozzle positioned radially outside the gutter and directed radially inward, and a panel extending above and radially inward from the air nozzle.

18 Claims, 3 Drawing Sheets

SENSOR DRAINAGE SYSTEM

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
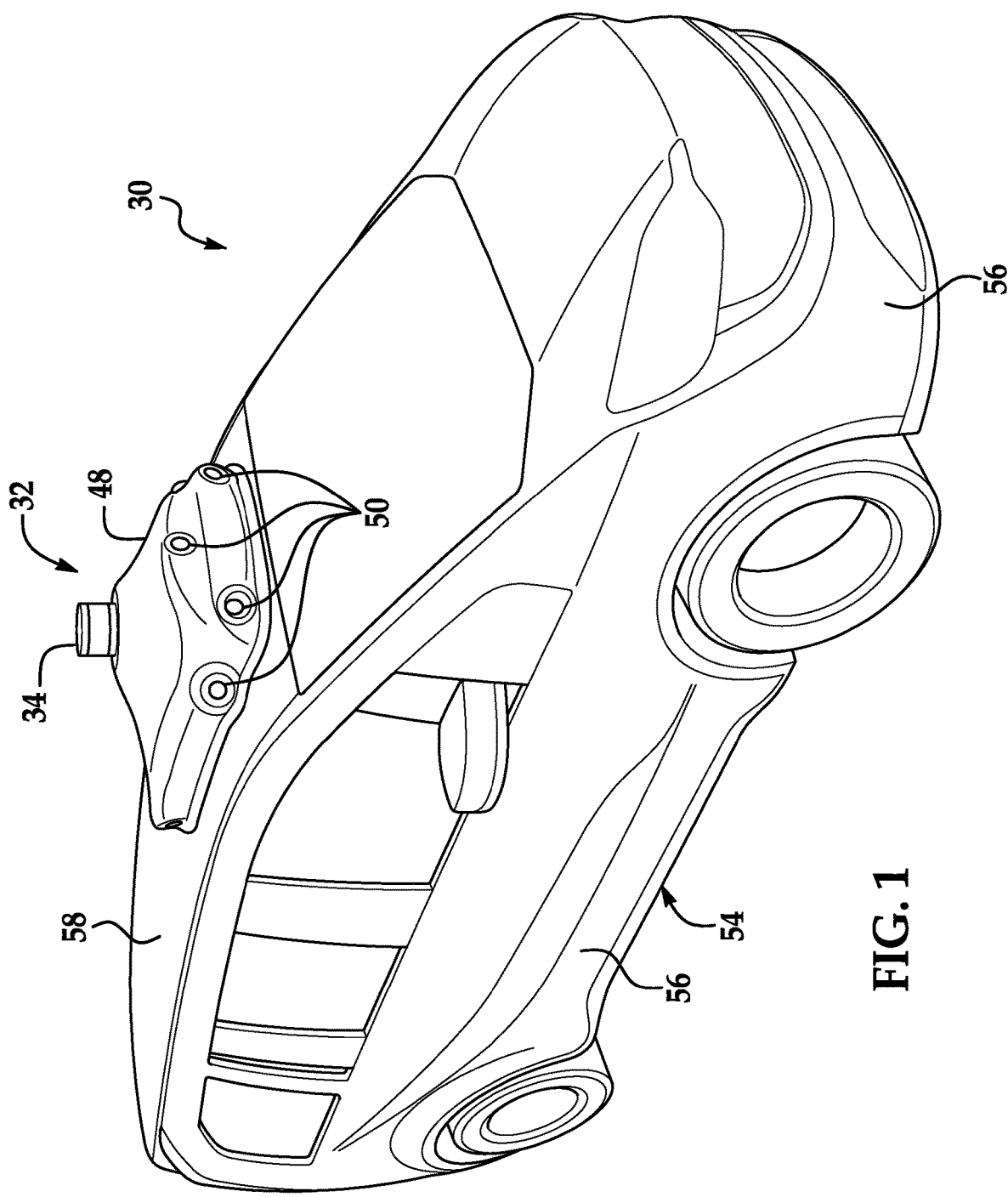
FIG. 1 is a perspective view of a vehicle.

A sensor assembly includes a cylindrical sensor housing including a sensor-housing bottom and extending vertically upward from a sensor-housing bottom, a gutter elongated circumferentially around the sensor-housing bottom, a drain channel extending radially outward from the gutter, at least one air nozzle positioned radially outside the gutter and directed radially inward, and a panel extending above and radially inward from the air nozzle.

The sensor assembly may further include a gutter wall, and the gutter may extend radially outward from the sensor housing to the gutter wall. The gutter wall may be elongated circumferentially around the sensor housing from the drain channel to the drain channel. The panel may be elongated circumferentially around the sensor housing from the drain channel to the drain channel, and the panel may define a gap between the panel and the gutter wall.

The panel may extend from radially outside the gutter wall to radially inside the gutter wall.

The gutter wall and the panel may form the air nozzle.

The gutter and the gutter wall may form a single piece.

The sensor assembly may further include a lip extending radially inward from the gutter wall and spaced from the gutter.

The panel may be elongated circumferentially around the sensor housing from the drain channel to the drain channel.

The gutter may have a nonhorizontal slope. The drain channel may extend from a lowest point of the gutter.

The gutter may slope downward in a rearward direction.

The drain channel may extend in a rearward direction from the gutter.

The sensor assembly may further include a bracket to which the sensor-housing bottom is mounted, and the bracket and the gutter may form a single piece.

The sensor assembly may further include a plurality of liquid nozzles arranged circumferentially around and aimed at the sensor housing. The liquid nozzles may be positioned to discharge liquid in a radially inward direction above the panel.

The air nozzle may be slot-shaped and elongated circumferentially around the gutter.

The sensor housing may include a cylindrical sensor window positioned above the panel.

With reference to the Figures, a sensor assembly 32 for a vehicle 30 includes a cylindrical sensor housing 34 extending vertically upward from a sensor-housing bottom 36, a gutter 38 elongated circumferentially around the sensor-housing bottom 36, a drain channel 40 extending radially outward from the gutter 38, at least one air nozzle 42 positioned radially outside the gutter 38 and directed radially inward, and a panel 44 extending above and radially inward from the air nozzle 42.

The sensor assembly 32 can provide an air nozzle 42 located below a sensor window 46 of the sensor housing 34 and able to clean the sensor window 46. The sensor assembly 32 can help prevent liquid such as water or washer fluid from entering the air nozzle 42, and the sensor assembly 32 can facilitate quick drainage of liquids from the sensor assembly 32. The sensor assembly 32 has a simple design with components that can be integrated into a design of a housing 48 for multiple other sensors 50.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate propulsion, brake system, steering, and/or other vehicle systems based at least in part on data received from a sensor 52 described below, as well as the other sensors 50. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 54. The vehicle 30 may be of a unibody construction, in which a frame and the body 54 of the vehicle 30 are a single component. The vehicle 30 may, alternatively, be of a body-on-frame construction, in which the frame supports the body 54 that is a separate component from the frame. The frame and body 54 may be formed of any suitable material, for example, steel, aluminum, etc.

The body 54 includes body panels 56 partially defining an exterior of the vehicle 30. The body panels 56 may present a class-A surface, e.g., a finished surface exposed to view by a customer and free of unaesthetic blemishes and defects. The body panels 56 include, e.g., a roof 58, etc.

Figure 2:
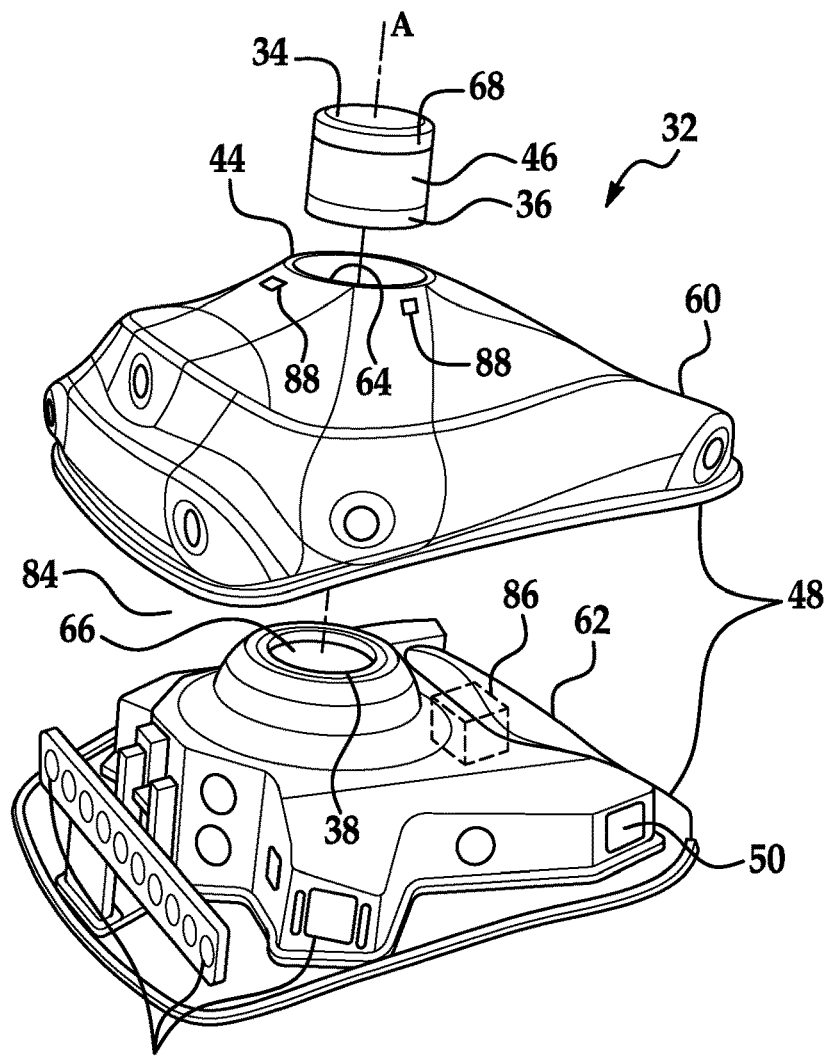
FIG. 2 is an exploded perspective view of a sensor assembly.
Figure 3:
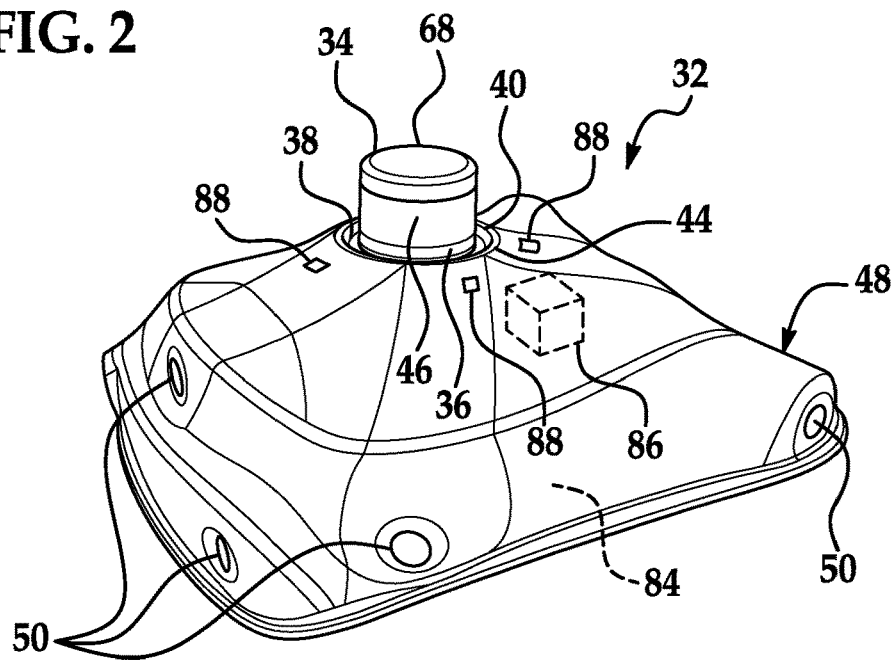
FIG. 3 is a perspective view of the sensor assembly.

With reference to FIGS. 2 and 3, the housing 48 for the sensor 52 and the other sensors 50 is attachable to the vehicle 30, e.g., to one of the body panels 56 of the vehicle 30, e.g., the roof 58. For example, the housing 48 may be shaped to be attachable to the roof 58, e.g., may have a shape matching a contour of the roof 58. The housing 48 may be attached to the roof 58, which can provide the sensor 52 and the other sensors 50 with an unobstructed field of view of an area around the vehicle 30. The housing 48 may be formed of, e.g., plastic or metal.

The housing 48 includes a housing upper 60 and a housing lower 62. The housing upper 60 and the housing lower 62 are shaped to fit together, with the housing upper 60 fitting on top of the housing lower 62. The housing upper 60 covers the housing lower 62. The housing upper 60 includes a central opening 64 that exposes the housing lower 62. The central opening 64 is round, e.g., has a circular or slightly elliptical shape. The housing upper 60 and the housing lower 62 are each a single piece, i.e., are a continuous piece of material with no internal seams separating multiple pieces. For example, the housing upper 60 and the housing lower 62 may each be stamped or molded as a single piece. The housing upper 60 includes the panel 44 and the drain channel 40, so the panel 44 and the drain channel 40 are together a single piece. The housing lower 62 includes the gutter 38, a gutter wall 74, a lip 90, and a bracket 66, so the gutter 38, gutter wall 74, lip 90, and bracket 66 are together a single piece.

With reference to FIG. 2, the housing lower 62 includes the bracket 66 to which the sensor-housing bottom 36 of the sensor housing 34 is mounted. The sensor housing 34 is supported by the housing 48, specifically by the housing lower 62. The sensor housing 34 can be disposed on top of the housing 48 at a highest point of the housing 48. The bracket 66 is shaped to accept and fix in place the sensor-housing bottom 36 of the sensor housing 34, e.g., with a press fit or snap fit. The bracket 66 defines an orientation and position of the sensor housing 34 relative to the vehicle 30.

Figure 4:
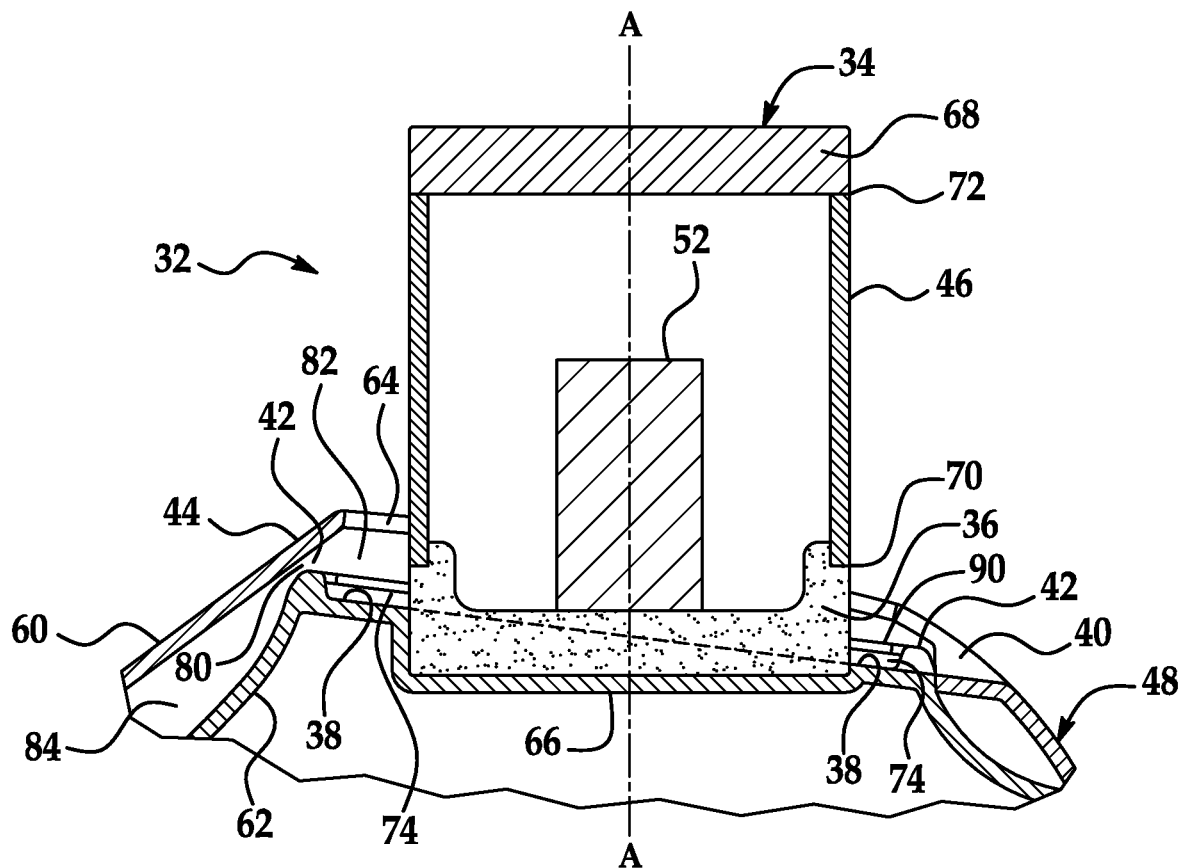
FIG. 4 is a side cross-sectional view of a portion of the sensor assembly.

With reference to FIG. 4, the sensor housing 34 has a cylindrical shape and defines an axis A. The sensor housing 34 extends vertically upward along the axis A from the sensor-housing bottom 36. The sensor housing 34 includes a sensor-housing top 68, the sensor window 46, and the sensor-housing bottom 36. The sensor-housing top 68 is disposed directly above the sensor window 46, and the sensor-housing bottom 36 is disposed directly below the sensor window 46. The sensor-housing top 68 and the sensor-housing bottom 36 are vertically spaced apart by a height of the sensor window 46.

The sensor 52 is disposed inside the sensor housing 34 and is attached to and supported by the housing 48. The sensor 52 may be designed to detect features of the outside world; for example, the sensor 52 may be a radar sensor, a scanning laser range finder, a light detection and ranging (LIDAR) device, or an image processing sensor such as a camera. In particular, the sensor 52 may be a LIDAR device, e.g., a scanning LIDAR device. A LIDAR device detects distances to objects by emitting laser pulses at a particular wavelength and measuring the time of flight for the pulse to travel to the object and back.

The sensor window 46 is cylindrical and defines the axis A, which is oriented substantially vertically. The sensor window 46 extends around the axis A. The sensor window 46 can extend fully around the axis A, i.e., 360°, or partially around the axis A. The sensor window 46 extends along the axis A from a bottom edge 70 to a top edge 72. The bottom edge 70 contacts the sensor-housing bottom 36, and the top edge 72 contacts the sensor-housing top 68. The sensor window 46 is positioned above the panel 44. For example, some or all of the bottom edge 70 is above the panel 44. The sensor window 46 has an outer diameter. The outer diameter of the sensor window 46 may be the same as the sensor-housing top 68 and/or the sensor-housing bottom 36; in other words, the sensor window 46 may be flush or substantially flush with the sensor-housing top 68 and/or the sensor-housing bottom 36. "Substantially flush" means a seam between the sensor window 46 and the sensor-housing top 68 or sensor-housing bottom 36 does not cause turbulence in air flowing along the sensor window 46. At least some of the sensor window 46 is transparent with respect to whatever medium the sensor 52 is capable of detecting. For example, if the sensor 52 is a LIDAR device, then the sensor window 46 is transparent with respect to visible light at the wavelength generated by the sensor 52.

The gutter 38 is elongated circumferentially around the sensor-housing bottom 36 and around the axis A, in particular, elongated circumferentially for 360° around the axis A, i.e., completely encircles the sensor-housing bottom 36. The gutter 38 has an elliptical shape with an inner minor axis. The inner minor axis of the gutter 38 is equal to or greater than the outer diameter of the sensor-housing bottom 36 and of the sensor window 46. The gutter 38 extends radially outward from the sensor housing 34 to the gutter wall 74. Each point on the gutter 38 is lower than the gutter wall 74 located radially outward from that point and lower than the sensor housing 34, e.g., the sensor window 46, located radially inward from that point. The gutter 38 has a non-horizontal slope. The gutter 38 slopes downward in a rearward direction. The slope may be a constant value, e.g., forming an angle θ, e.g., 5°, with a horizontal plane, the angle θ facing in a forward direction. The gutter 38 is part of the housing lower 62 and is a single piece with the rest of the housing lower 62. The gutter 38 borders and extends radially outward from the bracket 66.

Figure 5:
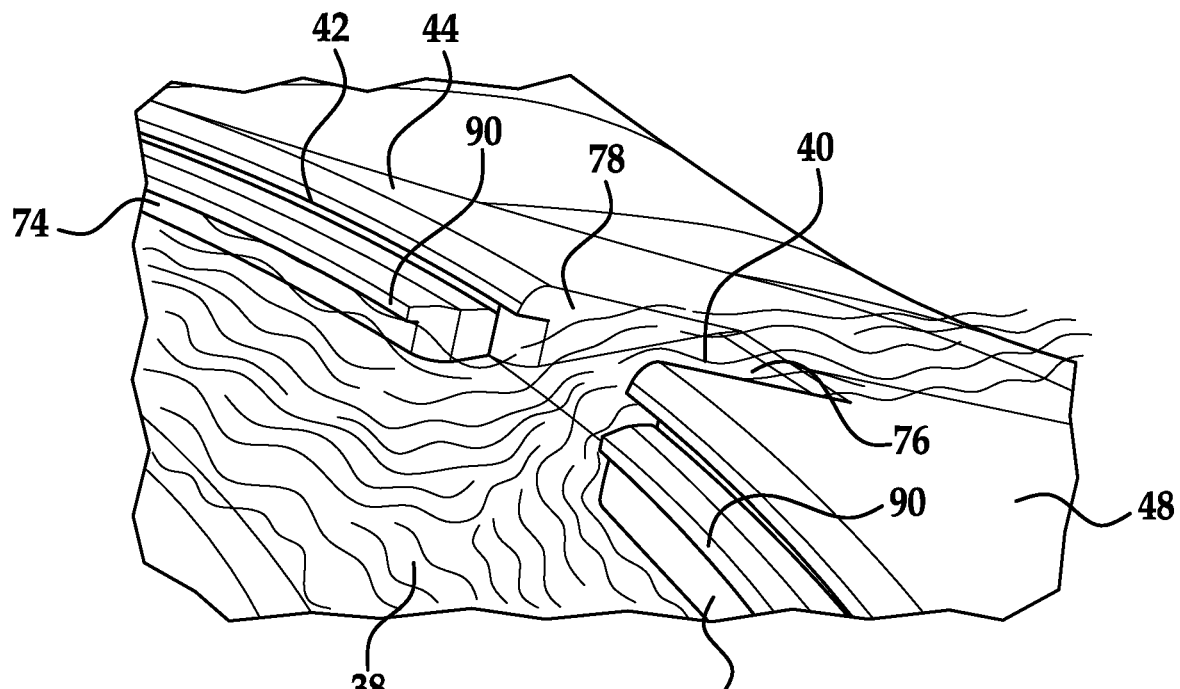
FIG. 5 is a perspective view of a portion of the sensor assembly.

With reference to FIG. 5, the drain channel 40 extends radially outward from the gutter 38 in a directly rearward direction. The drain channel 40 extends from a lowest point of the gutter 38. The drain channel 40 includes a drain-channel floor 76 oriented horizontally and positioned flush with the gutter 38, i.e., forming a continuous surface with the gutter 38 with respect to flowing liquid. The drain channel 40 includes two drain-channel walls 78 each extending upward from the drain-channel floor 76 to the panel 44 and extending rearward from the gutter wall 74 to the panel 44. The drain-channel floor 76 and drain-channel walls 78 define a U shape through which liquid can flow. The drain channel 40 is part of the housing upper 60 and is a single piece with the rest of the housing upper 60.

Returning to FIG. 4, the gutter wall 74 is elongated circumferentially around the axis A, around the sensor housing 34, and around the gutter 38, e.g., elongated circumferentially more than 270° around the axis A, e.g., elongated circumferentially around the axis A from the drain channel 40 to the drain channel 40, e.g., elongated circumferentially around the axis A from one of the drain-channel walls 78 to the other of the drain-channel walls 78. The gutter wall 74 extends upward from the gutter 38. In a radial cross-section, the gutter 38, the gutter wall 74, and the sensor-housing bottom 36 define a U shape through which liquid can flow. The gutter wall 74 is part of the housing lower 62 and is a single piece with the rest of the housing lower 62.

The lip 90 extends radially inward from the gutter wall 74 and is spaced from the gutter 38. The lip 90 can extend from a top edge of the gutter wall 74. The lip 90 is elongated circumferentially more than 270° around the axis A, e.g., elongated circumferentially around the axis A from the drain channel 40 to the drain channel 40, e.g., elongated circumferentially around the axis A from one of the drain-channel walls 78 to the other of the drain-channel walls 78. The lip 90 is elongated circumferentially coextensive with the gutter wall 74. The lip 90 is concentrically spaced from the sensor housing 34. The lip 90 can help prevent water in the gutter 38 from traveling over the gutter wall 74, e.g., from sloshing.

The panel 44 extends above the gutter wall 74 from radially outside the gutter wall 74 to radially inside the gutter wall 74. The panel 44 is elongated circumferentially around the axis A, around the sensor housing 34, and around the gutter 38, e.g., elongated circumferentially more than 270° around the axis A, e.g., elongated circumferentially around the axis A from the drain channel 40 to the drain channel 40, e.g., elongated circumferentially around the axis A from one of the drain-channel walls 78 to the other of the drain-channel walls 78. An inner edge of the panel 44 forms the central opening 64 of the housing upper 60. The panel 44 defines a first gap 80 between the panel 44 and the gutter wall 74, and the first gap 80 may have a substantially constant height circumferentially around the axis A from the drain channel 40 to the drain channel 40. The panel 44 defines a second gap 82 between the panel 44 and the sensor housing 34 extending circumferentially around the axis A, and the second gap 82 may have a substantially constant width, i.e., radial distance, circumferentially around the axis A from the drain channel 40 to the drain channel 40.

The gutter wall 74 and the panel 44 form the air nozzle 42. Air is directed through the first gap 80 between the panel 44 and the gutter wall 74. The panel 44 extends above and radially inward from the air nozzle 42, and the gutter wall 74 extends below the air nozzle 42. The air nozzle 42 is slot-shaped and elongated circumferentially around the axis A, around the sensor housing 34, and around the gutter 38, e.g., elongated circumferentially more than 270° around the axis A, e.g., elongated circumferentially around the axis A from the drain channel 40 to the drain channel 40, e.g., elongated circumferentially around the axis A from one of the drain-channel walls 78 to the other of the drain-channel walls 78. The air nozzle 42 is positioned radially outside the gutter 38 and is directed radially inward, i.e., air exits through the air nozzle 42 radially inward toward the sensor housing 34, e.g., toward the sensor window 46.

Returning to FIGS. 2 and 3, the housing upper 60 and the housing lower 62 form a chamber 84 by enclosing a space between the housing upper 60 and the housing lower 62. A compressor 86 can be positioned to pressurize the chamber 84, i.e., positioned to draw in air from outside the housing 48 and output air into the chamber 84. The compressor 86 increases the pressure of a gas by reducing a volume of the gas or by forcing additional gas into a constant volume. The compressor 86 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

A plurality of liquid nozzles 88 are arranged circumferentially around the axis A and aimed at the sensor housing 34, e.g., at the sensor window 46. The liquid nozzles 88 are mounted to the housing upper 60 radially outside of the panel 44. The liquid nozzles 88 are positioned to discharge liquid, e.g., washer fluid, in a radially inward direction above the panel 44 toward the sensor housing 34.

In operation, the chamber 84 between the housing upper 60 and the housing lower 62 can be pressurized by the compressor 86, causing air to exit through the first gap 80, i.e., through the air nozzle 42. The air exiting the air nozzle 42 is directed toward the sensor housing 34, specifically the sensor window 46. The airflow can remove obstructions from the sensor window 46 such as dust, and the airflow can deflect debris from striking the sensor window 46 that otherwise would have.

The liquid nozzles 88 can eject washer fluid at the sensor window 46 to clean an obstruction off of the sensor window 46. Alternatively, precipitation can occur. In either case, liquid flows down the sensor housing 34 and falls in the vicinity of the sensor housing 34. The panel 44 can prevent the falling liquid from entering the air nozzle 42. The liquid flowing down the sensor housing 34 enters the gutter 38. The gutter wall 74 and the lip 90 can prevent the liquid in the gutter 38 from entering the air nozzle 42. The liquid in the gutter 38 follows the downward slope of the gutter 38 to the drain channel 40 and exits through the drain channel 40.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A sensor assembly comprising:
   a cylindrical sensor housing including a sensor-housing bottom and extending vertically upward from a sensor-housing bottom;
   a gutter elongated circumferentially around the sensor-housing bottom;
   a drain channel extending radially outward from the gutter;
   at least one air nozzle positioned radially outside the gutter and directed radially inward; and
   a panel extending above and radially inward from the air nozzle.

2. The sensor assembly of claim 1, further comprising a gutter wall, wherein the gutter extends radially outward from the sensor housing to the gutter wall.

3. The sensor assembly of claim 2, wherein the gutter wall is elongated circumferentially around the sensor housing from the drain channel to the drain channel.

4. The sensor assembly of claim 3, wherein the panel is elongated circumferentially around the sensor housing from the drain channel to the drain channel, and the panel defines a gap between the panel and the gutter wall.

5. The sensor assembly of claim 2, wherein the panel extends from radially outside the gutter wall to radially inside the gutter wall.

6. The sensor assembly of claim 2, wherein the gutter wall and the panel form the air nozzle.

7. The sensor assembly of claim 2, wherein the gutter and the gutter wall form a single piece.

8. The sensor assembly of claim 2, further comprising a lip extending radially inward from the gutter wall and spaced from the gutter.

9. The sensor assembly of claim 1, wherein the panel is elongated circumferentially around the sensor housing from the drain channel to the drain channel.

10. The sensor assembly of claim 1, wherein the gutter has a nonhorizontal slope.

11. The sensor assembly of claim 10, wherein the drain channel extends from a lowest point of the gutter.

12. The sensor assembly of claim 10, wherein the gutter slopes downward in a rearward direction.

13. The sensor assembly of claim 1, wherein the drain channel extends in a rearward direction from the gutter.

14. The sensor assembly of claim 1, further comprising a bracket to which the sensor-housing bottom is mounted, wherein the bracket and the gutter form a single piece.

15. The sensor assembly of claim 1, further comprising a plurality of liquid nozzles arranged circumferentially around and aimed at the sensor housing.

16. The sensor assembly of claim 15, wherein the liquid nozzles are positioned to discharge liquid in a radially inward direction above the panel.

17. The sensor assembly of claim 1, wherein the air nozzle is slot-shaped and elongated circumferentially around the gutter.

18. The sensor assembly of claim 1, wherein the sensor housing includes a cylindrical sensor window positioned above the panel.

\* \* \* \* \*